3,302,883
MOBILE IRRIGATION SYSTEM
William H. Stout, 223 N. Jessup St.,
Portland, Oreg. 97217
Filed Jan. 18, 1965, Ser. No. 426,331
11 Claims. (Cl. 239—212)

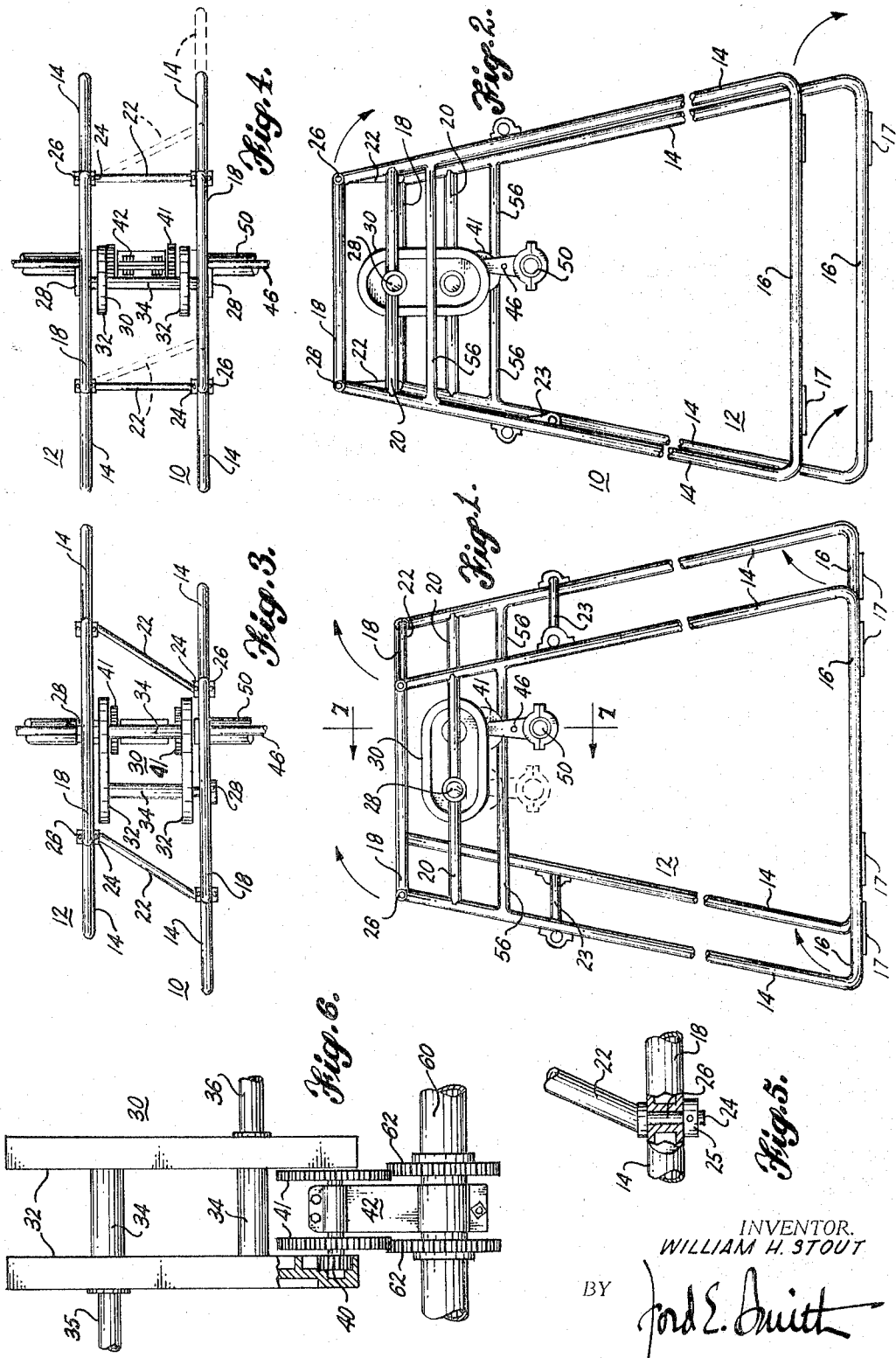

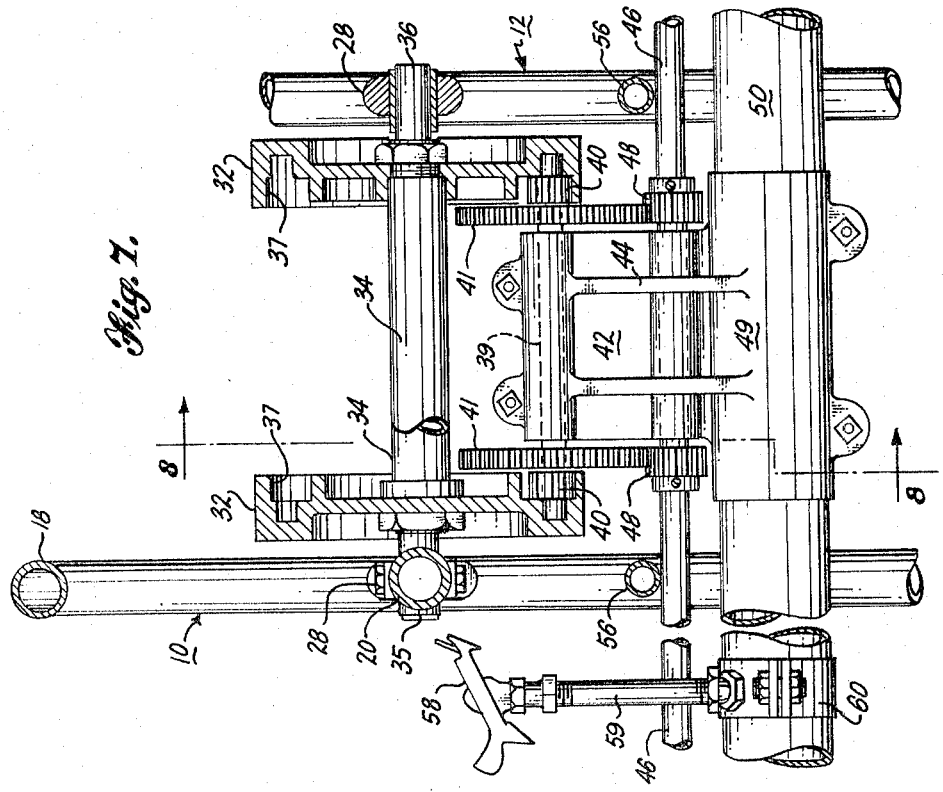
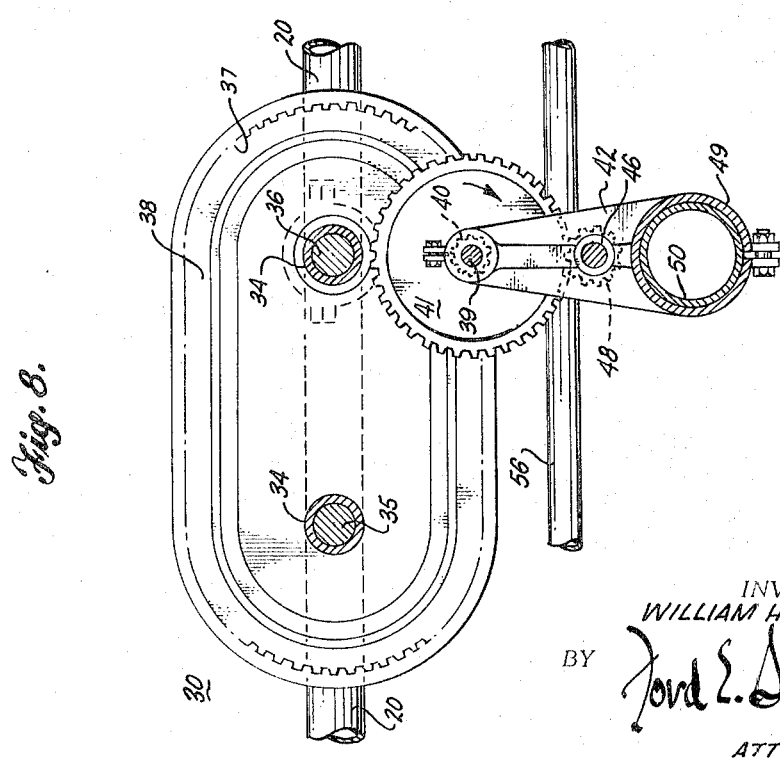

This invention relates to a mobile irrigation system and, more particularly, to irrigation systems wherein an elongated conduit and its water dispensing units is maintained at a substantial elevation above the ground and, while so maintained, is moved relative to the ground in a direction lateral of the elongated conduit. This application is related to applicant's co-pending application Serial No. 264,159, filed March 11, 1963, now Patent No. 3,223,461.

It is an object of this invention to provide walking mechanisms in a series for an elongated, elevated-pipe irrigation system which ambulates as a result of a cranking action at the walking mechanisms actuated by rotary force applied throughout the system, preferably at an end.

Another object is the provision of relatively simple but powerful actuation means for ambulatory walking mechanisms for use in mobile irrigation systems.

Still another object of the invention has been the provision of a novel power-actuated crank for imparting ambulation to walking mechanisms.

And a further object of this invention resides in providing simple, easily operated supporting and moving apparatus for a mobile irrigation system which permits water application above very high crops such as cotton and sugar cane for example.

This system is designed to overcome some of the disadvantages of known systems among which are those wherein a series of wheels spaced along an elongated conduit support it and provide mobility. The wheel system restricts the height above the ground that the conduit may have or the wheels become so unwieldy that they may not be driven by rotation supplied at the end of the conduit. In its preferred form, this system is designed to obviate rotation of the water dispensing heads along the conduit as the walking mechanisms are ambulated.

It will be apparent during the course of the following specification how these and other objects of the invention are accomplished. The following disclosure is to be read with reference to the accompanying drawings, in which:

FIGURES 1 and 2 are views in side elevation of the walking mechanism of this mobile irrigation system showing the supports in two positions;

FIGURES 3 and 4 are top plan view of the mechanism of FIGURES 1 and 2, respectively;

FIGURE 5 is a fragmentary view of a crank connection with a support;

FIGURE 6 is a face of the main crank showing one manner in which the same is power actuated;

FIGURE 7 is a cross-sectional view taken in the plane 7—7 of FIGURE 1;

FIGURE 8 is a cross-sectional view taken in the plane 8—8 of FIGURE 7, showing the gearing relationship whereby the main crank is actuated.

Irrigation apparatus in which the present invention is incorporated may be for crops of any height, eight, ten, twelve or more feet above the ground. And it may be constructed so that it extends across large fields, for example, installation may be one-eighth or one-quarter of a mile in length. Power to activate the mechanism will customarily be supplied at one end and be transmitted throughout the system lengthwise. Also, water is supplied to the conduit at an end and by it conveyed to the multiple dispensers installed in the system.

As may be seen by reference to FIGURES 1–4, each walking mechanism comprises a pair of juxtaposed supports, designated as a whole, 10 and 12. Each support includes in this instance a pair of legs 14 which may be connected by ground-engaging foot bars which may have pads 17 to increase ground engagement. The upper ends of the legs are joined by upper and lower cross bars 18 and 20 which rigidify the support frame and provide structure by which pairs of supports may be joined and actuated for ambulatory movement. The supports are preferably formed of welded-together, lightweight, tubular members, preferably aluminum, to insure rigidity and keep weight low.

A pair of supports 10 and 12 are disposed side-by-side. Between their upper corners are spacer cranks 22 which connect the supports and guide them in their ambulatory movement. As may be seen in FIGURE 5, at each end of a spacer crank 22 is a spacer crank pin 24 which is secured for rotation in journal 26 in the support by a collar 25. As one support is ambulated relative the other, spacer cranks 22 swing and define a semi-conical path maintaining parallelism between the supports. Secondary spacer cranks 23 may be mounted between supports 10 and 12 as needed to insure that the supports ambulate in parallel and have lateral stability.

Each cross bar 20 has a journal 28, intermediate its ends, by which power actuatable means is mounted between a juxtaposed pair of supports. When supports 10 and 12 are disposed as shown in FIGURE 1, the axes of journals 28 are offset from each other. Mounted therebetween is crank mechanism 30, a main part of the support-actuatable means to impart ambulation to the apparatus.

Referring to FIGURES 6, 7 and 8, actuated crank 30 comprises a pair of spaced-apart crank arms 32, 32 joined by cross bars 34, 34. Offset crank pins 35, 36 extend outwardly from crank arms 32. Crank pin 35 is secured in journal 28 of support 10 and crank pin 36 is secured in journal 28 of support 12. Actuation of crank 30 causes crank pins 35 and 36 to alternately move in semi-circular paths the ends of which are spaced twice the distance of the offset of pins 35, 36. In FIGURE 8, pins 35 and 36 are shown as extensions of cross bars 34 which may be bolts or threaded tubes that, with suitable nuts, secure the crank arms 32 in secured rigid relation.

In each of the opposed faces of the crank arms 32 is formed an oblong or elliptical gear rack 37 preferably having its teeth directed inward. The shape of rack 37 is that of a symmetrical oval. The curved ends are circular and concentric with the cross bars 34. The flat sides of the rack are preferably parallel and tangential with the curved end portions. A groove 38 in each arm is contiguous with the gear rack and follows the same shape or pattern. Countershaft 39, having its ends disposed in grooves 38, extends between the crank arms 32, 32 as shown in FIGURE 8 and receives the paired gears 40, 41. Gears 40 are pinions in mesh with racks 37 and gears 41 are intermediate and speed reducing transfer gears. Gears 40 and 41 are integral and rotate freely on shaft 39. Preferably they are formed of a plastic material requiring no lubrication.

A hanger clamp 42, preferably formed in bolted together halves, is suspended from shaft 39 between the gears 41, 41 and provides a journal 44 for drive shaft 46. Drive pinions 48, 48 mesh with the transfer gears 41 and are secured for rotation with the drive shaft. Hanger 42 also has a clamp 49 which engages around conduit 50. In this case it is non-rotary.

Rotation of drive shaft 46 and gears 48 results in rotation of transfer gears 41 and pinions 40 causing the same to either move on racks 37 or to move racks 37 and arms 32 in a swinging or cranking action more fully described later. The ends of shaft 39 may move in grooves 38 and thus are jurnalled at all times.

Stop bars 56 extend between legs 14 of each support frame at right angles to and slightly above shaft 46. Bars 56 prevent pinions 48 from climbing the curved end portions of racks 37. Thereupon the cranks 32 move relative the pinions 48 to tilt the crank 30 up and over, thus producing ambulatory movement of the supports relative each other and the earth.

Conduit 50 has water dispensing means, such as sprinkler or spray heads 58 located intermediate the walking mechanisms of a series. A clamp 52 engages around conduit 50 and supports in a slightly offset manner standpipe 54, which, in turn, supports the head 58 in an upright manner.

A power unit and a water supply is operatively attached at the end of a series of walking mechanisms to their interconnecting conduit and drive transmitting structure to supply the necessary rotative force to actuate the gears. In this instance shaft 46 is rotated by power applied near an end as from a tractor with a power take-off or by any other suitable power unit. The supply of water to the conduit likewise takes place at one of its ends in which case the other end is usually capped or otherwise closed. Normally, water is supplied under high pressure from a pump means of conventional nature. Since it is considered that the application of power and the supply of water to the inner connecting conduit and drive transmitting structure may be accomplished in several conventional manners, and the same forms no essential part of this invention, the details thereof have been omitted to simplify the disclosure.

In the operation of the equipment there may be water dispensing cycles and intermittent moving cycles during which no water is dispensed. However, this system permits water to be continuously dispensed while forward movement of the conduit occurs whether such movement be slow and continuous or intermittent. It should be noted that in the case of apparatus shown in FIGURE 6, conduit 60 has gears 62, 62 secured thereto in mesh with gears 41 by which pinions 40 are rotated. In this case, power is transmitted by rotating conduit 60. Since the sprinkler heads 58 and their standpipes 59 are secured to conduit 60 it is desirable that the water be shut off when conduit 60 is rotated, as otherwise it would be thrown in an irregular and undesirable pattern. For this reason, the apparatus of FIGURE 6 will not permit continuous water dispensing and continuous advancement of the conduit over the ground. Both are intermittent, preferably.

From the foregoing specification it should be apparent to those skilled in the art that a novel and extremely practical ambulatory overhead irrigation system is disclosed, which has numerous advantages over wheel-supported types as well as ambulatory systems previously known. A modification has been shown as to the mode of driving or powering the system. Others will be apparent. All such as fall within the spirit and scope of the invention as defined by the subjoined claims are intended to be covered by this patent which is to be narrowly construed with a view of the original and pioneer nature of this invention.

What is claimed, is:

1. A mobile irrigation system, comprising:
   a substantially aligned series of walking mechanisms, each mechanism comprising a pivotally joined pair of ambulatory supports;
   actuatable crank means interconnecting said paired supports and operable to produce ambulatory movement of said supports relative each other;
   elongated conduit and drive-transmitting structure spaced from said actuatable crank means and extending the length of said series of walking mechanisms interconnecting the same into a system; said drive-transmitting structure being operably associated with said actuatable crank means;
   water dispensing means associated with said conduit structure intermediate said walking mechanisms; and
   power supply means associated with said structure whereby power transmitted thereby to said actuatable crank means produces ambulatory movement of said supports.

2. An irrigation system according to claim 1, in which the elongated conduit is suspended beneath said actuatable crank means by said walking mechanism; and the drive-transmiting structure is separate from said conduit and includes a rotary shaft extending the length of the system.

3. An irrigation system according to claim 1, in which said structure comprises an elongated conduit rotarily suspended from said walking mechanisms and power is supplied to the conduit, said conduit being operatively connected to said actuatable crank means operable to produce ambulatory movement of said supports.

4. An irrigation system according to claim 1, in which the interconnecting actuatable crank means of a pair of supports comprises a crank arm having offset crank pins each operatively connected with a support of the pair, and power is supplied to the crank arm.

5. The structure according to claim 4, in which there is a gear train between the drive-transmitting structure and the crank arm.

6. The structure according to claim 5, in which said gear train includes a closed path gear rack associated with said arm and extending about said crank pins, and said drive-transmitting structure includes a driven gear meshed with said gear rack.

7. The structure, according to claim 5, in which the gear train is powered by means of a rotary drive shaft extending parallel to said conduit.

8. An irrigation system accordng to claim 1, in which each walking mechanism comprises a spaced-apart pair of multilegged frames providing longitudinal stability to the system, said frames being spaced apart and joined by a pair of alignment-maintaining cranks and by a third actuatable crank having a crank arm and offset crank pins each operatively connected with a frame of such pairs, and power is supplied by the drive-transmitting structure to the crank arm of the third crank.

9. An ambulatory walking mechanism in combination with a mobile irrigation system in which there is elongated conduit and drive-transmitting structure, comprising:
   a juxtaposed pair of upright support frames to be moved relative to each other in parallel paths while supporting said conduit and drive-transmitting means elevated from the ground;
   first, second and third crank means between said frames, each journalled to each frame with the journals of said crank means being similarly offset with respect to each other, said crank means being spaced from said conduit and drive-transmitting structure; and
   power transmitting means between at least one of said linking means and said drive-transmitting structure to actuate the same to impart relative movement of the frames with respect to each other.

10. The structure according to claim 4 in which said actuatable crank means having offset crank pins includes two like rigidly spaced apart crank arms the opposed faces of which have matching gear racks that extend in closed paths about the axes of said crank pins, and said drive-in transmitting means include interconnected driven gear means meshed with said gear racks.

11. In a mobile irrigation system including an elongated conduit,
  pairs of pivoted-together conduit supporting ambulatory standards spaced along said conduit;
  actuatable crank means and crank actuating means supported by said standards independent of said conduit to actuate said pairs of standards to impart ambulatory movement thereto to transport said conduit over the ground; and
  water dispensing means distributed along said conduit.

References Cited by the Examiner
UNITED STATES PATENTS

| 1,500,723 | 7/1924 | Roy | 180—8 |
| 3,223,461 | 12/1965 | Stout | 305—2 |
| 3,230,969 | 1/1966 | Purtell | 137—344 X |

MILTON BUCHLER, *Primary Examiner.*

BENJAMIN HERSH, RICHARD J. JOHNSON,
*Examiners.*